E. SCHNEIDER.
APPARATUS FOR LOADING GUNS.
APPLICATION FILED FEB. 28, 1919.

1,332,763.

Patented Mar. 2, 1920.
19 SHEETS—SHEET 10.

Inventor.
Eugène Schneider
by, Marns, Cameron, Lewis Massie
Attorneys

E. SCHNEIDER.
APPARATUS FOR LOADING GUNS.
APPLICATION FILED FEB. 28, 1919.
1,332,763.
Patented Mar. 2, 1920.
19 SHEETS—SHEET 11.
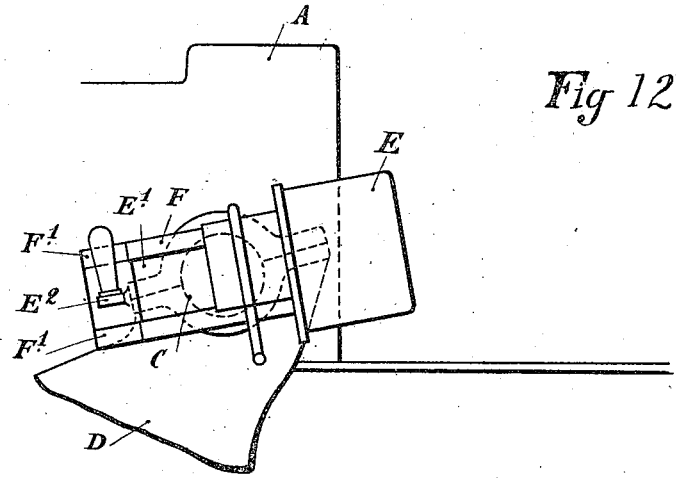
Fig 12ᵃ
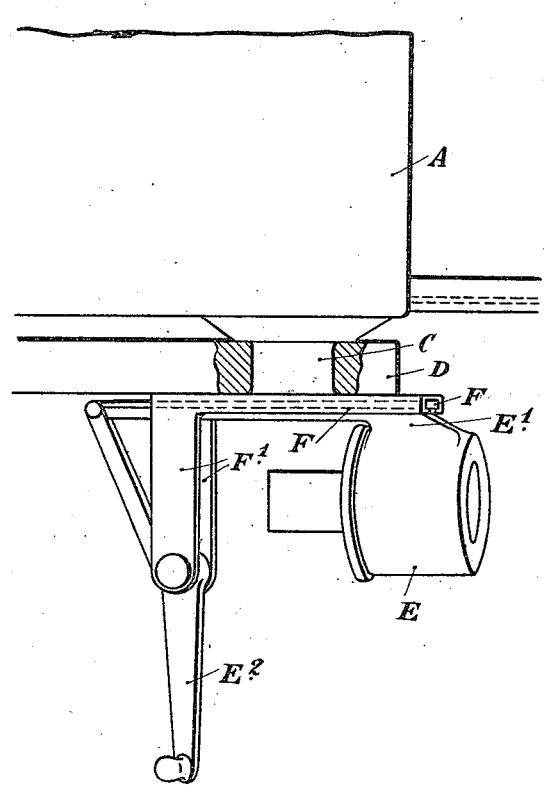
Fig 13ᵃ
Inventor.
Eugene Schneider
By Mauro, Cameron, Lewis + Massie
Attorneys.

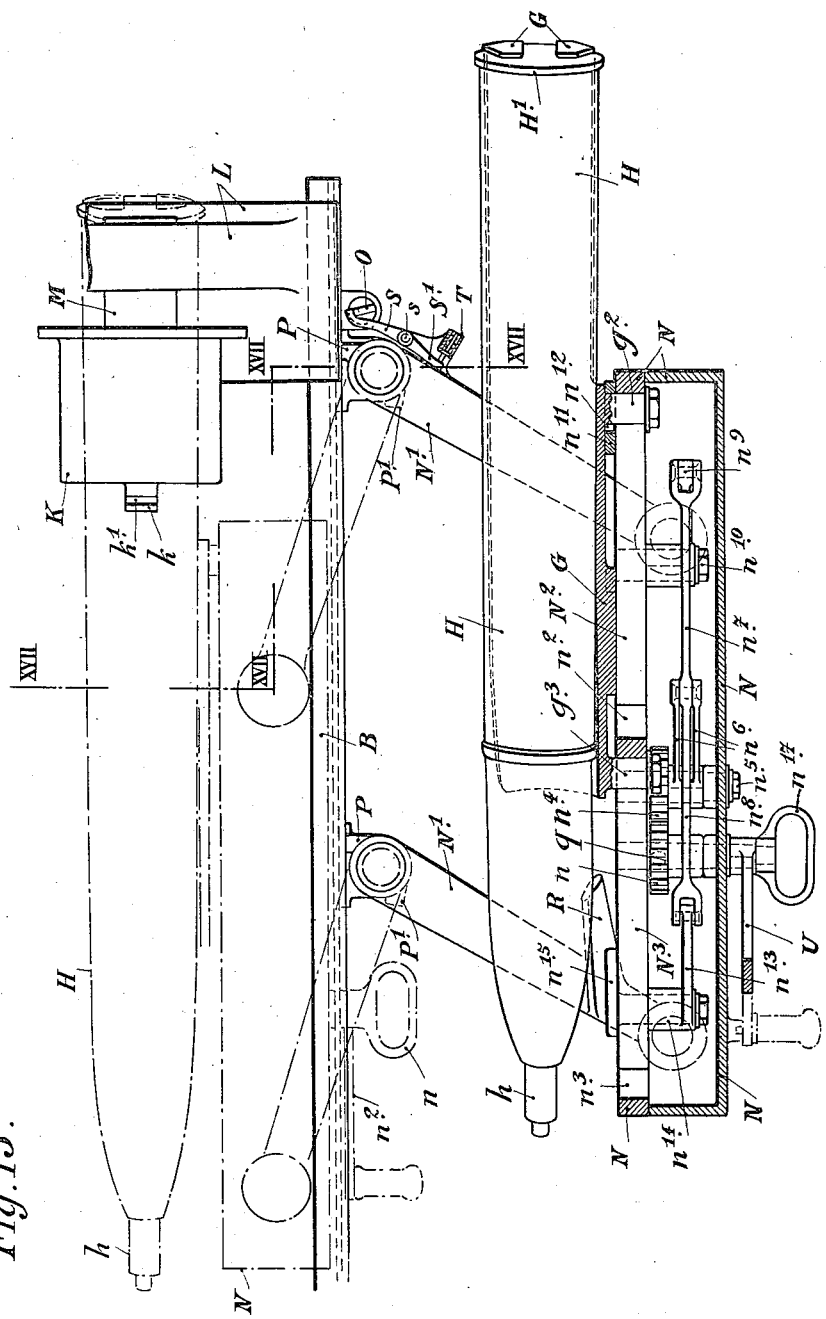

E. SCHNEIDER.
APPARATUS FOR LOADING GUNS.
APPLICATION FILED FEB. 28, 1919.

1,332,763.

Patented Mar. 2, 1920.
19 SHEETS—SHEET 14.

Inventor.
Eugene Schneider
by Mauro, Cameron, Lewis & Massie
Attorneys

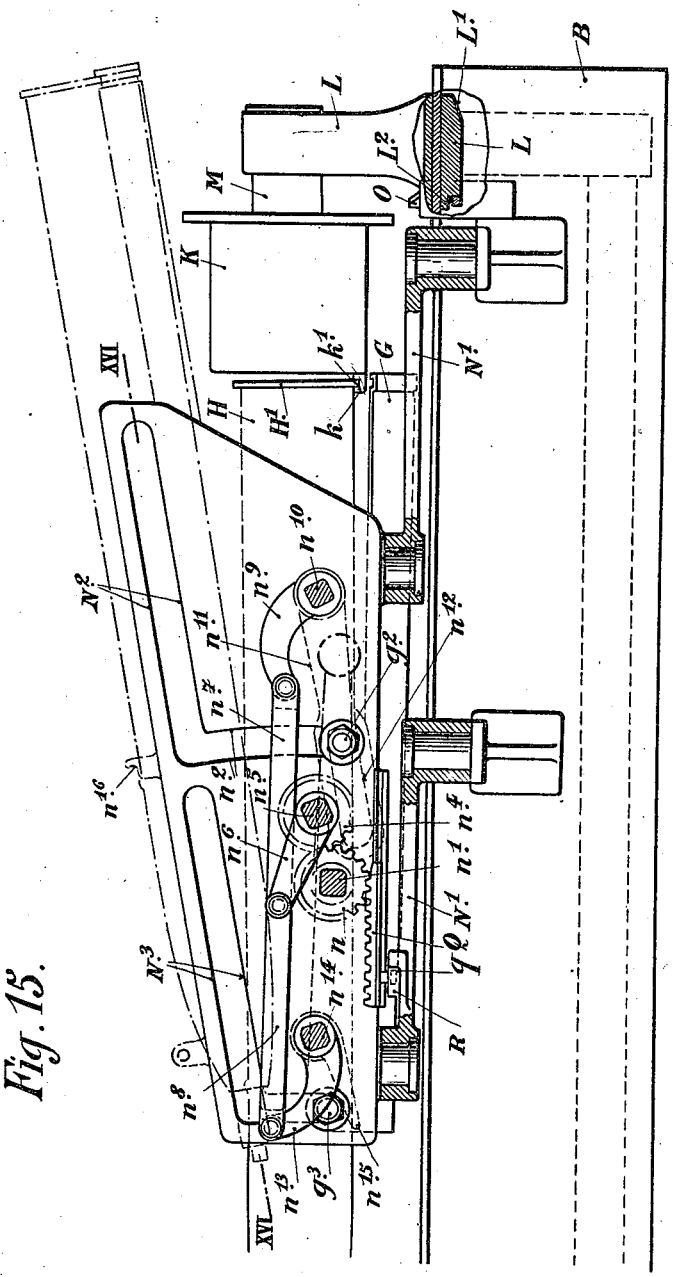

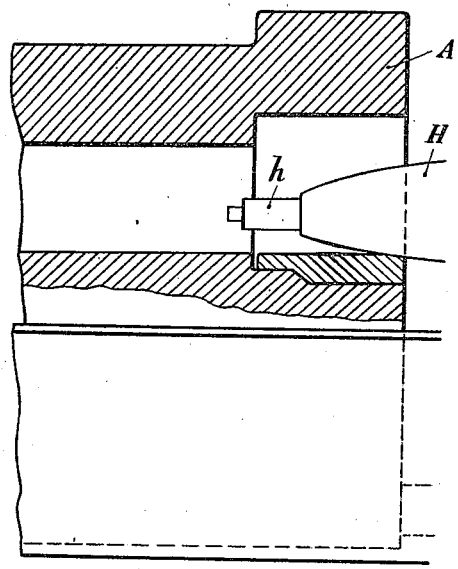
Fig.15ᵃ
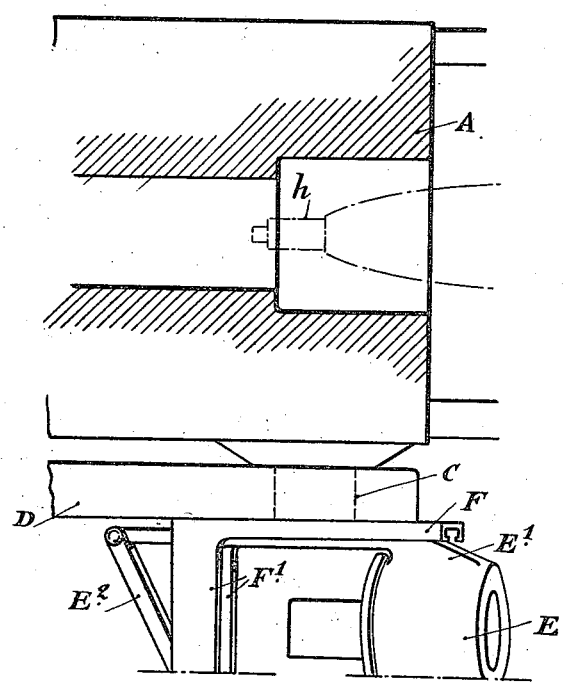
Fig.16ᵃ

E. SCHNEIDER.
APPARATUS FOR LOADING GUNS.
APPLICATION FILED FEB. 28, 1919.

1,332,763.

Patented Mar. 2, 1920.
19 SHEETS—SHEET 17.

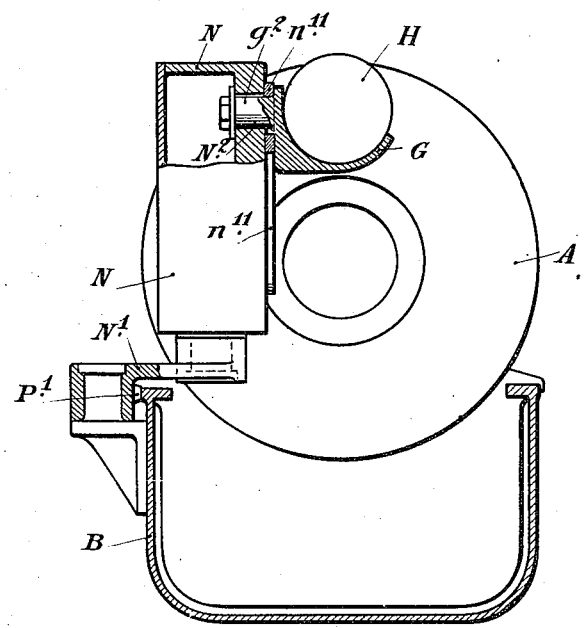
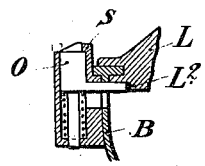

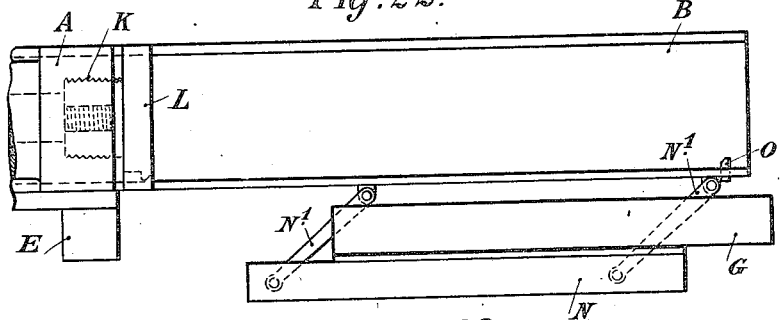
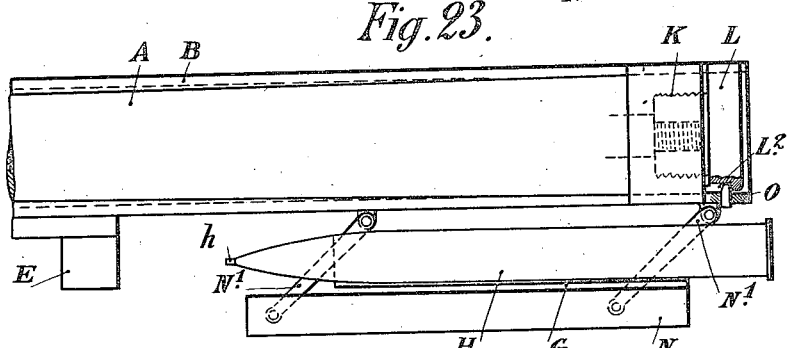
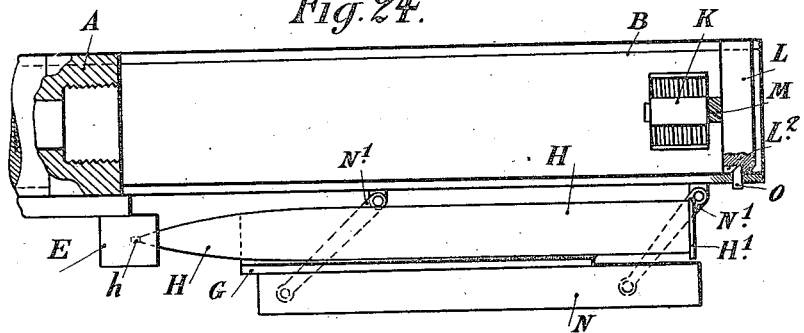
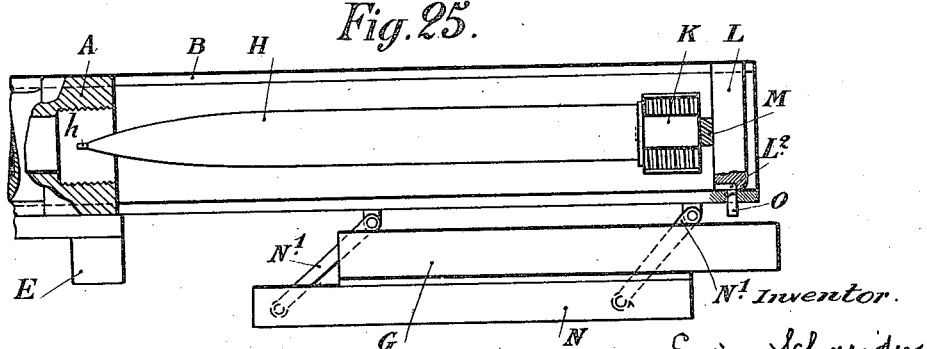

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

APPARATUS FOR LOADING GUNS.

1,332,763.  Specification of Letters Patent.  Patented Mar. 2, 1920.

Application filed February 28, 1919. Serial No. 279,873.

*To all whom it may concern:*

Be it known that I, EUGÈNE SCHNEIDER, a citizen of the French Republic, and a resident of 42 Rue d'Anjou, Paris, France, have invented a new and useful Improvement in Apparatus for Loading Guns, which invention is fully set forth in the following specification.

This invention has for its object to provide an improved apparatus which is more particularly applicable to guns of medium and large calibers, for the purpose of effecting in a convenient manner the setting of the time fuse ring of the shell and the insertion of the latter into the breech of the gun. The invention consists substantially in the arrangement of a setting device at a suitable point of the oscillating mass of the gun, and in the combination of this setting device with a trough mounted on the gun cradle and designed to receive the shell. These two parts (the setting device and the trough) are mounted on their respective supports in such a manner that either of them, or both of them, or one relatively to the other can be moved in such a manner as to allow:

1. Of bringing the axis of the shell (which has been previously placed in the trough) in line with the axis of the setting device, and of bringing the latter and the fuse suitably together.

2. Of bringing the axis of the shell mounted in the trough, in line with the axis of the gun barrel for the purpose of charging the shell into the latter.

Various ways of carrying out this invention, and various constructional forms of the improved apparatus are illustrated by way of example in the accompanying drawings in which:

Figures 1 to 8 inclusive illustrate a first constructional example of the invention.

Figs. 12 to 25 illustrate another constructional form of the invention.

Figure 12:
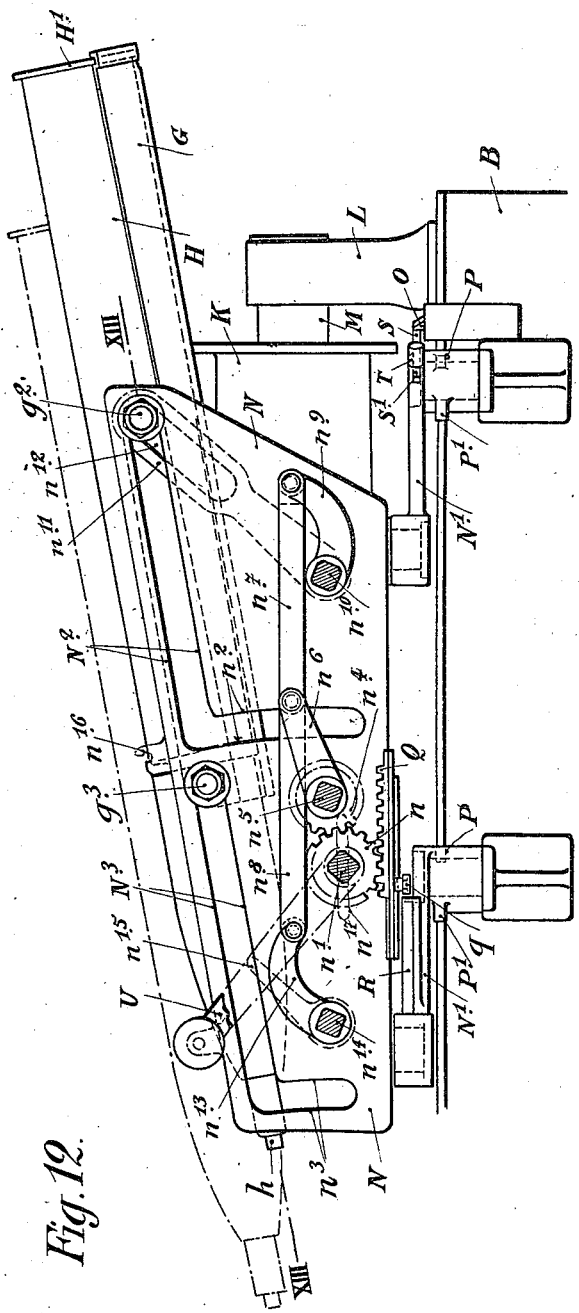

Figs. 12 and 12ª, which are complements of each other, are a side elevation of the gun carriage showing the trough-supporting frame in the position it occupies for the purpose of setting the fuse.

Figs. 13 and 13ª, which are complements of each other, show a plan of the same, partly in section on the line XIII—XIII of Fig. 12.

Figure 14:
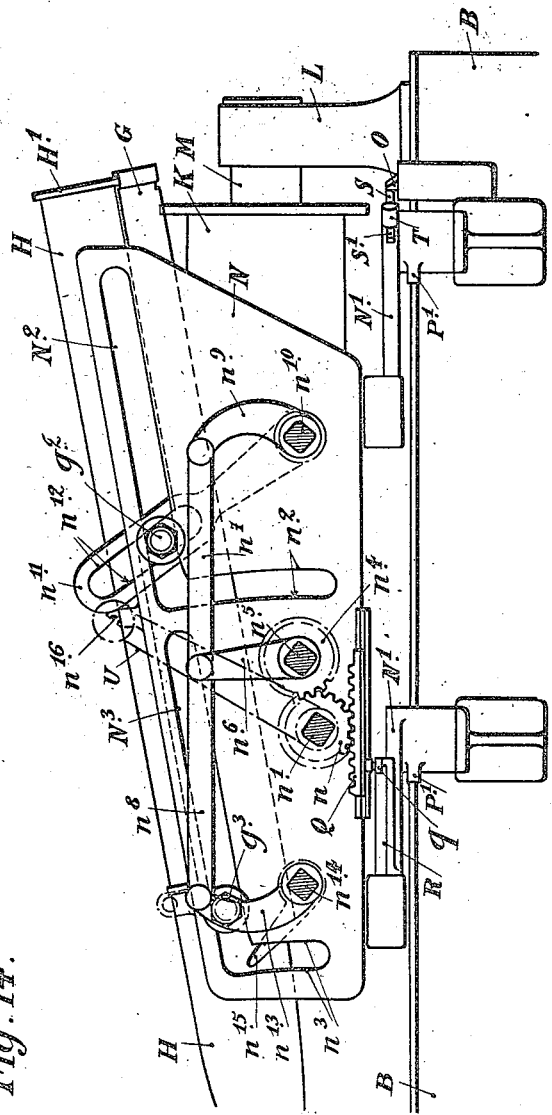
Figure 14A:
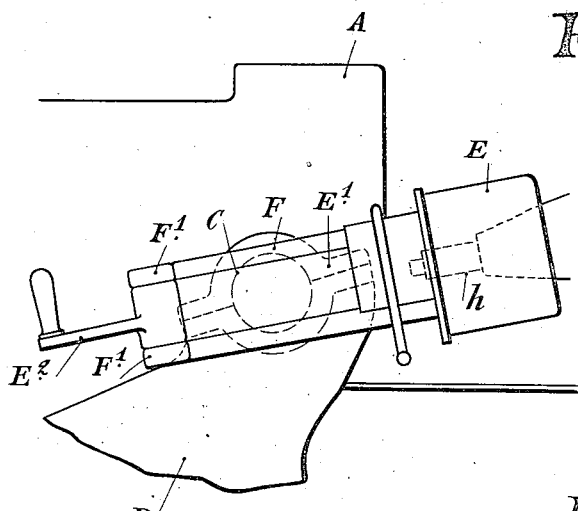

Figs. 14 and 14ª, which are complements of each other, are a side elevation similar to Figs. 12 and 12ª, showing the trough and the fuse-setting device in the position they occupy when they have been shifted one toward the other for the purpose of setting the fuse.

Figs. 15 and 15ª, which are complements of each other, are a side elevation showing the cradle-supporting frame and the parts carried by it, in the position they occupy when the rim of the shell has been engaged by the breech-block serving as a rammer.

Figure 16:
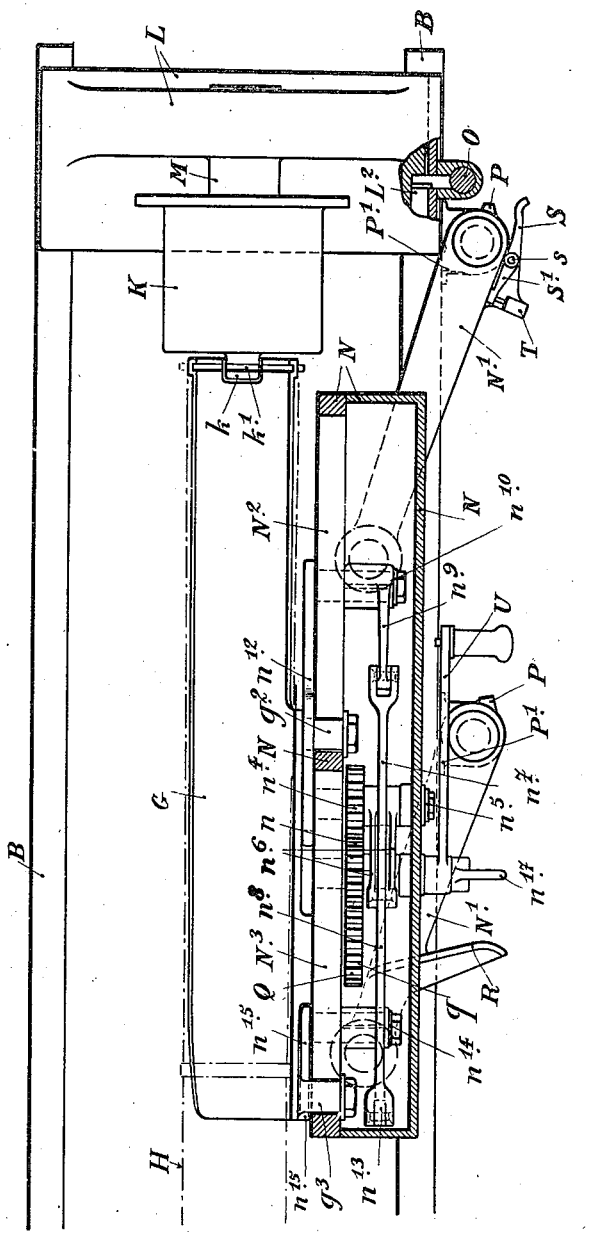

Figs. 16 and 16ª, which are complements of each other, are a plan view of the same, partly in section on the line XVI—XVI of Fig. 15.

Fig. 17 is a vertical cross-section on the line XVII—XVII of Fig. 13, the parts being shown in the position indicated in dot and dash lines in the latter figure.

Figure 18:
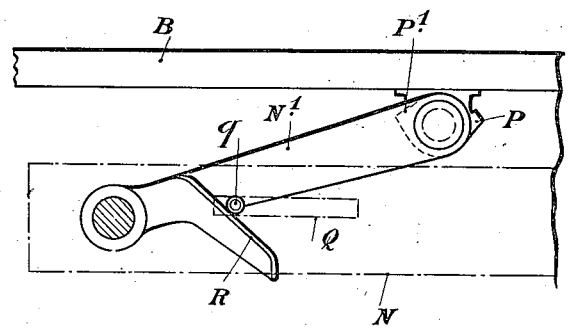

Fig. 18 is an enlarged detailed plan view showing the ramp for actuating the rack for reversing the action of the gear mechanism.

Figures 19, 20:
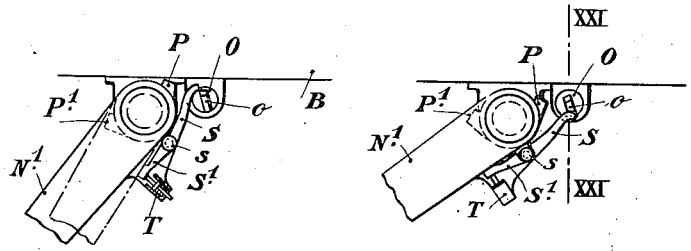

Figs. 19 and 20 are detailed plan views of the trip for releasing the catch from the breech-block carrier.

Fig. 21 is a vertical section on the line XXI—XXI of Fig. 20.

Figs. 22 to 25 are diagrammatic views showing different positions of the several parts during the recoil and the running out of the gun barrel.

Referring more particularly to Figs. 1 to 8, A is a gun barrel of any suitable known type adapted to slide in a cradle B which is mounted on trunnions C in a gun carriage D.

According to this invention a fuse-setting device E is mounted in a bracket F fixed to one of the cradle trunnions C. The fuse-setting device E is adapted to slide by means of an extension $E^1$ in guides formed in the bracket F. To-and-fro motion is given to the device $E$—$E^1$ by means of a handle $E^2$.

This setting device which is movable in a bracket formed on the cradle trunnion is combined with a trough G designed to receive the shell H, for the purpose of setting the fuse $h$ and inserting the shell into the gun barrel. The body of the trough is formed in the usual manner of a sort of semi-cylindrical cradle, and is pivoted to the gun cradle B by two arms $G^1$. The cradle B may for this purpose be provided with two blocks $B^1$ carrying the pivot pins $g^1$. The arms $G^1$ are fixed each to a lever $G^2$ to which is jointed a rod $G^3$ moving in a box $B^2$ provided under the cradle. A spring $G^4$ coiled around the rod $G^3$ bears at one end against the bottom $b^2$ and at its other end against a shoulder $g^3$ on the said rod. The spring $G^4$ has thus a constant tendency to push the shoulder $g^3$ toward the bottom $b^3$ of the box, and to cause the entire combination $G^2$—$G^1$—$G$ to tip in such a manner as to keep the trough to one side out of the way in the position shown in Fig. 3.

Figure 1:
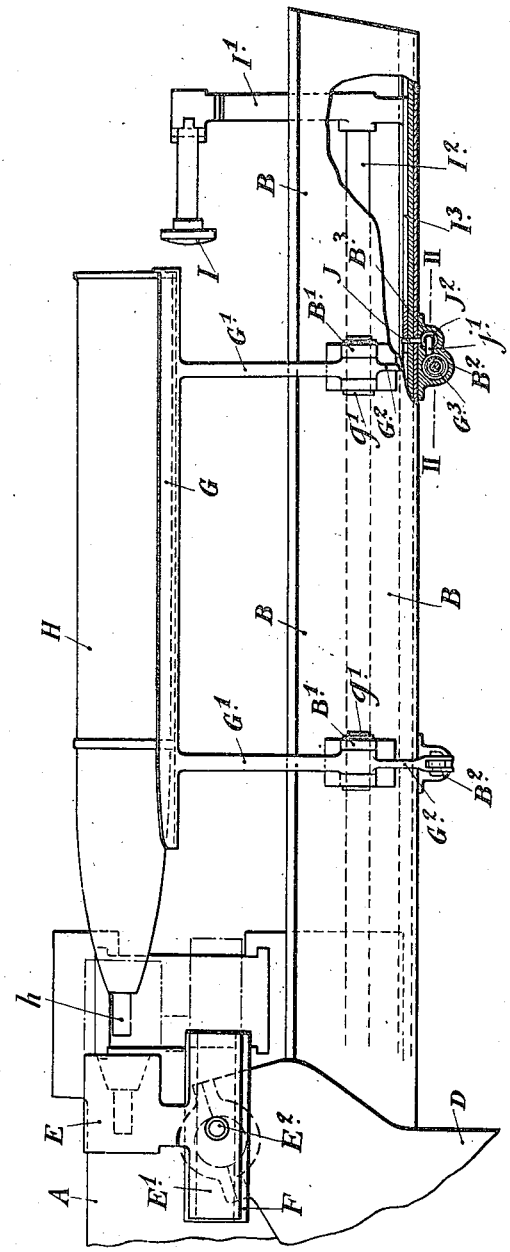
Fig. 1 is a side elevation showing the charging trough jointed to the gun cradle in the position it occupies for setting the fuse. The setting device combined with the trough is shown in full lines in its inoperative position, and in dot and dash lines in the position it occupies during the setting of the fuse.
Figure 2:
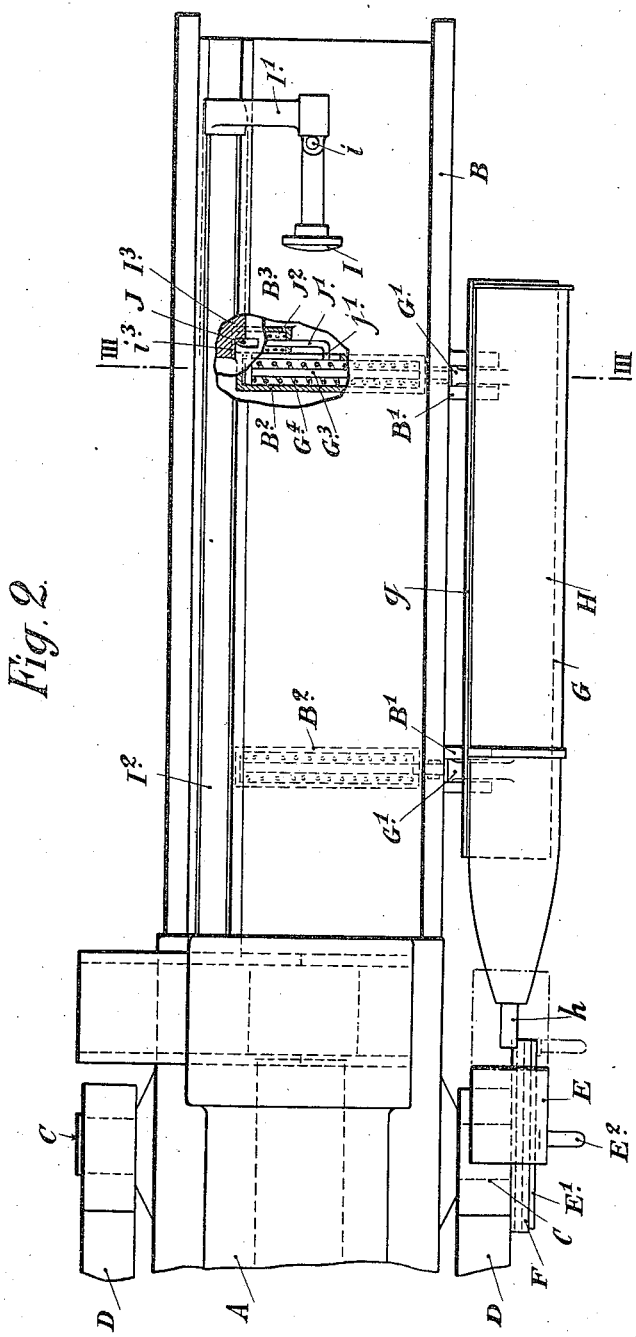
Fig. 2 is a plan partly in section on the line II—II of Fig. 1.

In this first constructional example it has been assumed that the ramming of the shell is effected automatically in the usual manner by a rammer I adapted to move with the recoil of the gun barrel A and to become engaged in the end position of recoil for the purpose of ramming. The supporting arm $I^1$ of the rammer I is carried by a guide bar $I^2$ which is actuated in the usual manner by a recuperator. This arm is adapted to engage by means of a guide bar $I^3$ suitably notched at its end $i^3$, behind a catch J. This catch is mounted in a box $B^3$ arranged at the side of one of the boxes $B^2$. Its head projects through the said box and has a bent tail $J^1$ guided in the axis of the box $B^3$. A spring $J^2$ has a constant tendency to keep the catch in its engaging position (Figs. 1 and 2). A finger $j^1$ formed on the end of the tail $J^1$, works in a longitudinal groove in the box $B^2$ in which there also works a finger $g^4$ formed on the shoulder $g^3$.

Figure 3:
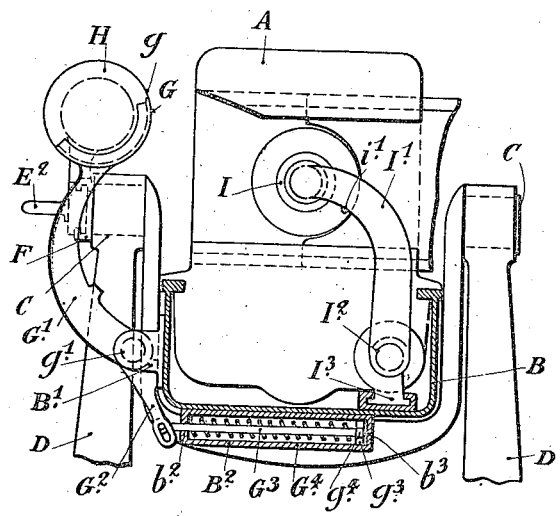
Fig. 3 is an end elevation partly in section on the line III—III of Fig. 2.
Figure 4:
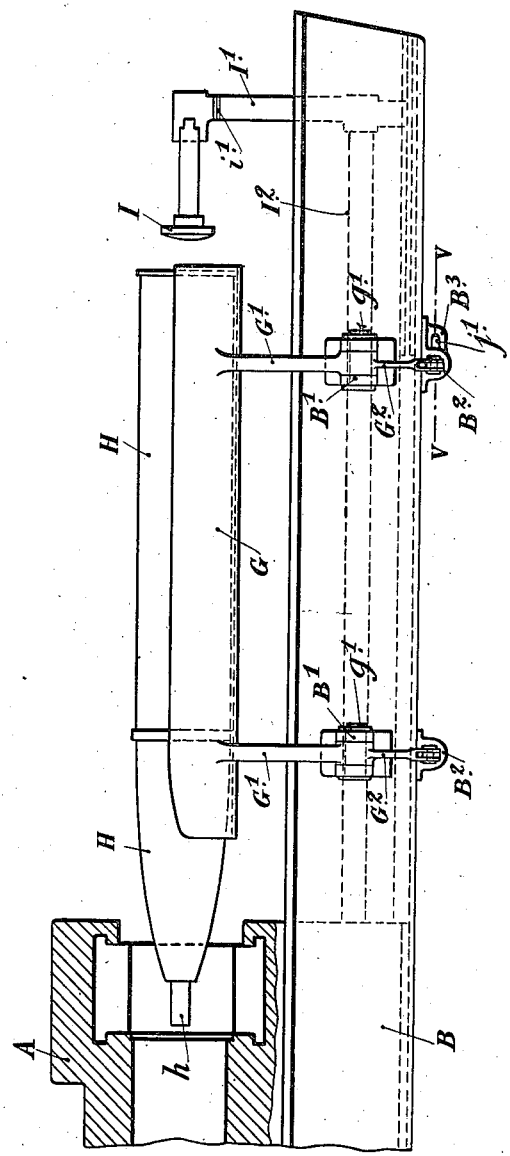
Fig. 4 is a side elevation similar to Fig. 1, but showing the trough in the position it occupies for charging the shell into the gun breech.
Figure 5:
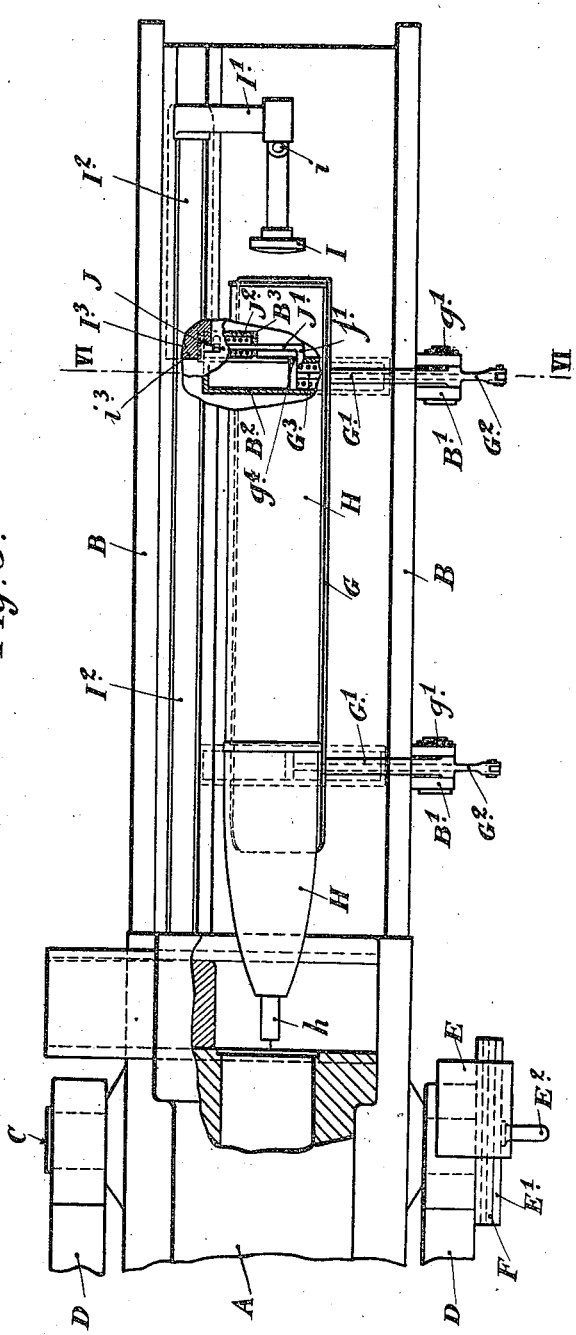
Fig. 5 is a plan partly in section on the line V—V of Fig. 4.
Figure 6:
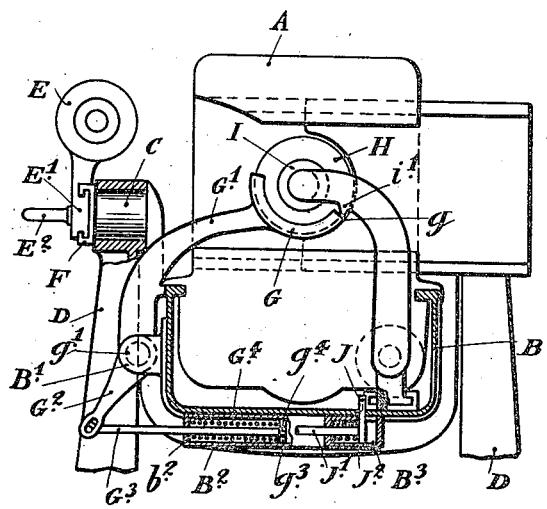
Fig. 6 is an end elevation partly in section on the line VI—VI of Fig. 5.
Figure 7:
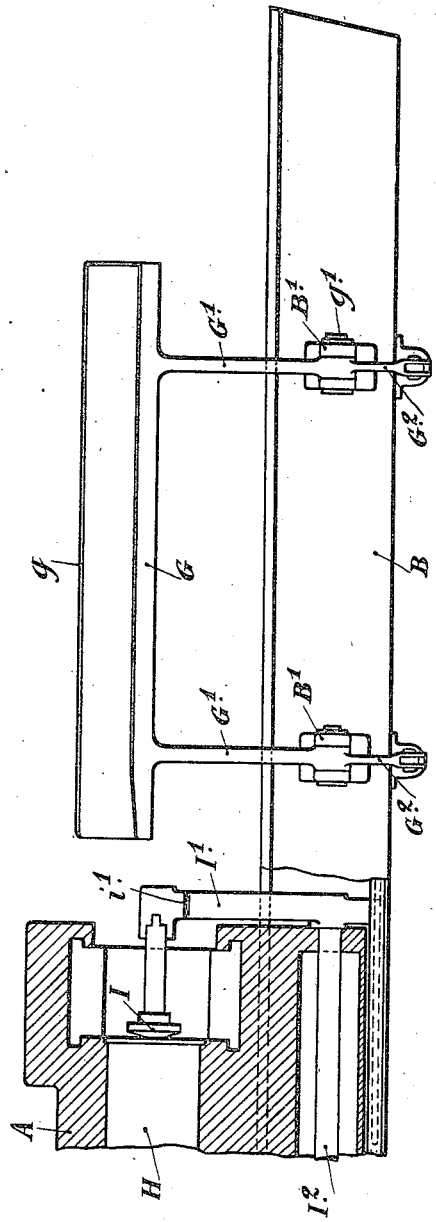
Fig. 7 is a side elevation showing the charging trough in the position it occupies after the shell has been rammed into the gun breech.
Figure 8:
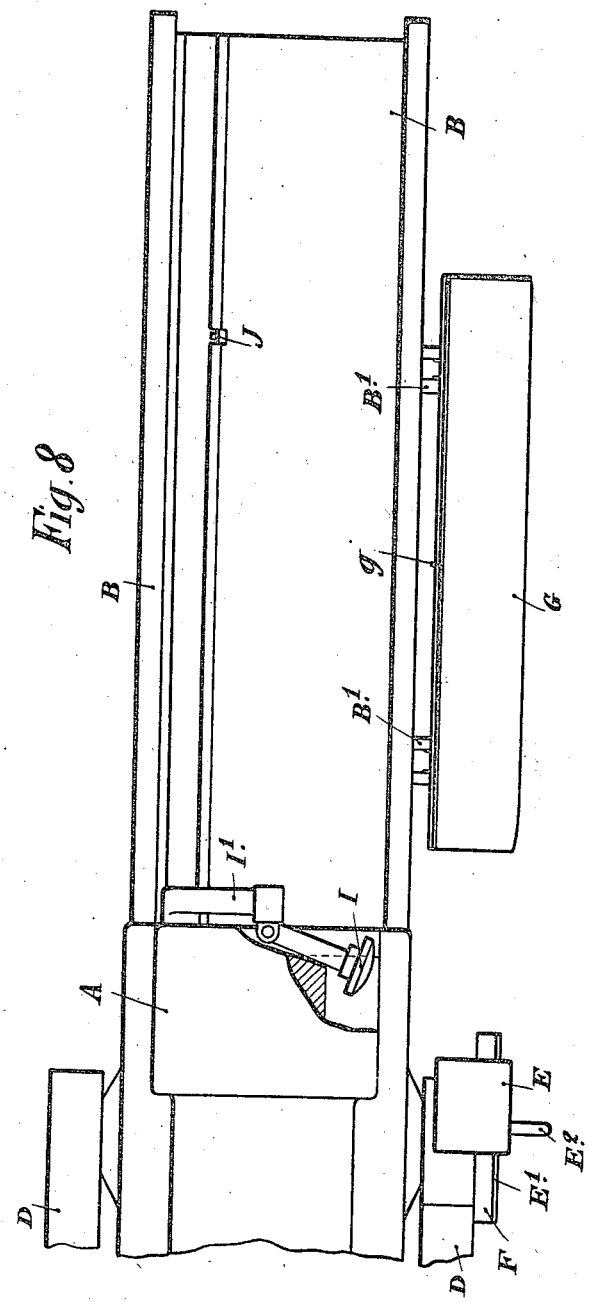
Fig. 8 is a corresponding plan showing the rammer moved out of the way by the closing of the breech.

The improved apparatus operates as follows:

The parts being in the positions shown in Fig. 8, the gun barrel A in recoiling after firing, carries the rammer I with it into the end position of the recoil. When, in the recoil, the bar $I^3$ meets the catch J, it forces it to one side and causes it to compress the spring $J^2$. When the bar $I^3$ moves back, as soon as the catch J comes opposite the notch $i^3$, it will be caused by the spring $J^2$ to enter the said notch. The catch J will then keep the rammer cocked in its position of extreme recoil (Figs. 1 to 3). The trough G having been charged with a shell H, the fuse is set by moving the fuse-setting device E by means of the handle $E^2$, out of the position shown in full lines in Figs. 1 and 2, into the position indicated in dot and dash lines. The fuse-setting device itself may be of any known type, such as is shown in Patent No. 699,900, May 13, 1902, so that it need not be described or shown here in detail.

When the setting of the fuse has been effected, the setting device is returned into the position shown in full lines in Figs. 1 and 2.

The shell is then inserted into the gun breech. For this purpose by pushing the arms $G^1$, the cradle G is caused to tip in such a manner as to bring the trough with the shell into the position shown in Figs. 4, 5 and 6. In this movement which is deadened by the compression of the springs $G^4$, the shoulder $g^3$—$g^4$ will at the end of its travel, meet the nose $j^1$ of the tail $J^1$ and will move the latter with the catch J which is thereby disengaged from the notch $i^3$. At this moment the axis of the shell is situated exactly in line with the axis of the gun barrel. A spiral spring coiled around the joint pin $i$ of the rammer, had returned the latter into the position shown in Figs. 1, 2, 4 and 5, as soon as it was left to itself owing to the gun barrel returning into firing position. The said disengaged rammer is returned by the action of the recuperator to which it is connected, and it rams the shell home (position shown in Fig. 7). So long as a part of the shell remains in the trough G during the ramming, the trough is prevented from following the action of the springs $G^4$, not only by the weight of the shell, but also by the action of a projection $i^1$ which is formed on the arm $I^1$ (Fig. 6) bearing against the inner longitudinal edge $g$. As soon as the arm $I^1$ has moved beyond the forward end of the trough, the latter is entirely free and will be returned by the springs $G^4$ into the position shown in Figs.

1, 2 and 3. After the shell has been rammed in, the breech may be closed by any suitable known means. The breech block K in closing, moves the rammer I out of the way into the position shown in Fig. 8.

Figure 9:
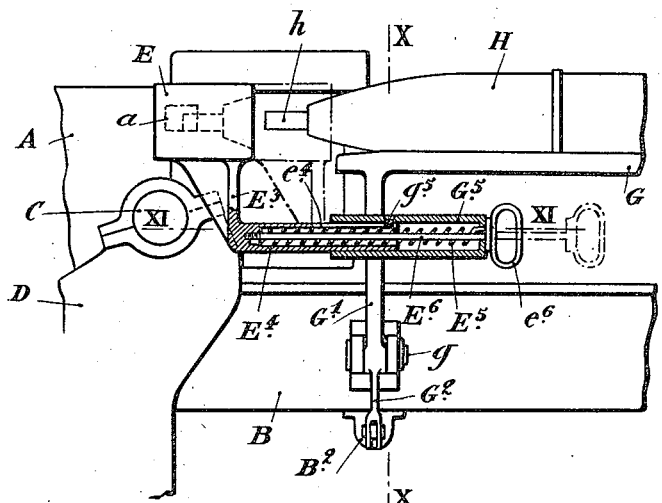
Figs. 9 and 10 are respectively a side elevation (partly in section) and vertical cross-section on the line X—X of Fig. 9 of a modification of the constructional example shown in the previous figures.
Figure 10:
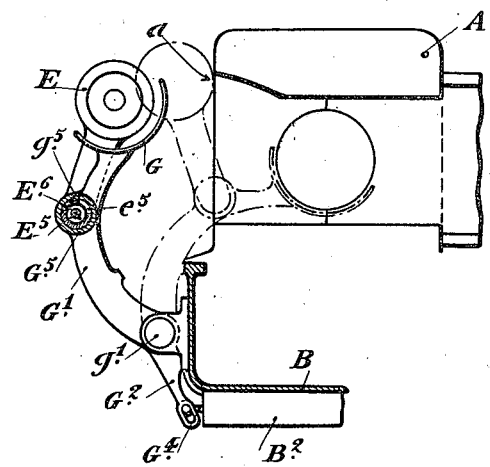
Figure 11:
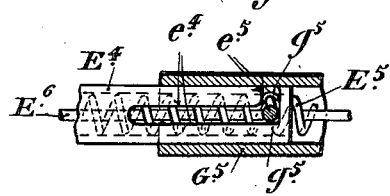
Fig. 11 is a partial horizontal section on the line XI—XI of Fig. 9.

In the modification shown in Figs. 9, 10 and 11, the fuse-setting device E, instead of being movably mounted on one of the gun cradle trunnions, is movably mounted on one of the supporting arms $G^1$ of the trough G. For this purpose the setting device carries at the end of an arm $E^3$, a sleeve $E^4$ by which it is guided in a cylinder $G^5$ carried by the arm $G^1$. A stud $g^5$ projecting internally from the side of the cylinder $G^5$, is engaged in a slot $e^4$—$e^5$ formed in the sleeve $E^4$. A spring $E^5$ coiled around an actuating rod $E^6$, is fixed at one end to the end of the sleeve $E^4$ and at its other end to the end of the cylinder $G^5$. This spring has a constant tendency to keep the said device E in the position shown in full lines in Figs. 9 and 10.

To set the fuse $h$, the handle $e^6$ of the rod $E^6$ is actuated to move the setting device into the position indicated in dot and dash lines in Fig. 9, the portion $e^4$ of the slot $e^4$—$e^5$ sliding over the stud $g^5$. After the setting the releasing of the handle $e^6$ is sufficient to cause the setting device to resume its initial position.

In the tipping movement of the arms $G^1$ which is effected in order to bring the trough G and the shell H into the charging position indicated in dot and dash lines in Fig. 10, the setting device E is stopped by a stop $a$ carried by the gun breech. The trough is able to complete its movement owing to the transverse movement of the cylinder $G^5$ relatively to the socket $E^4$; in which the stud $g^5$ comes into the position indicated in dot and dash lines in Fig. 11 at the end of the transverse portion $e^5$ of the slot. In this movement the spring $E^5$ is twisted. As soon as, by the tipping of the arms $G^1$ in the reverse direction, the trough has returned into the position in which the stud $g^5$ engages in the portion $e^4$ of the slot, the setting device E and the trough G together as a whole, will be returned by the springs $G^4$ of the preceding example, into the position shown in full lines in Figs. 9 and 10.

Figs. 12 to 25 illustrate another constructional form of the invention. In this example the trough for the shell is adapted to receive various movements in a frame connected to the gun cradle by means of a parallel motion. As in the example shown in Figs. 1 to 8, the fuse-setting device E is in this example movable in a bracket F fixed to one of the gun cradle trunnions C. The improved apparatus is assumed to be applied to a gun comprising in the known manner a breech block K with interrupted screw-threads mounted in a sliding nut L by means of an extension M formed with a very long-pitch screw-thread. The sliding breech block carrier is cocked in the extreme position of recoil of the gun barrel in such a manner that in the running out movement of the latter the movement imparted to the breech block will cause its extension M to be unscrewed from the sliding nut L. The gun barrel is adapted to return alone into firing position as soon as the breech block has been unscrewed, that is to say, when the projecting threads of the latter have come opposite the plain portions of the breech screw. The breech block being thus cocked and unscrewed, will act as a rammer. The construction and arrangement of the trough-supporting frame is such as to assure the release of the sliding nut as soon as the shell whose fuse has been previously set, is brought into position for being rammed into the breech of the gun.

Complementary Figs. 12 and $12^a$ are a side elevation of the gun carriage showing the trough-supporting frame in the position it occupies for the purpose of setting the fuse; the breech block carriage L being cocked in the position of extreme recoil, while the gun barrel is run out for firing. In this figure the cover of the trough-supporting frame has been assumed to be removed for the purpose of showing the parts for producing the movements of the trough and frame.

As in the example shown in Figs. 1 to 8, the fuse-setting device E is adapted to move by means of an extension $E^1$ in a supporting slide F fixed to one of the gun cradle trunnions C. The fuse-setting device may be moved toward the trough-supporting frame N by means of an actuating lever $E^2$ fulcrumed in a block $F^1$ fixed to the guide F.

The trough G may receive various movements in a frame N which is pivoted to the gun cradle B by means of connecting rods $N^1$, the frame and the two connecting rods forming one of the longitudinal sides, and both transverse sides of a parallel motion. By means of a handle $n^{17}$ the frame N can be moved at will into the position indicated in dot and dash lines in Fig. 13, or be returned into the position shown in full lines in that figure. In the position indicated in dot and dash lines, the shell resting in the trough G, is situated with its axis in line with the longitudinal axis of the gun barrel. In the position shown in full lines the axis of the shell is situated in line with the longitudinal axis of the fuse-setting device.

The trough G is adapted to receive in its supporting frame the following movements:

1. A to-and-fro movement toward and away from the fuse-setting device.

2. A falling and rising movement; the trough being in its elevated position for the fuse-setting operation and being then depressed for engaging the shell with the breech block screw, after the shell has been first brought into the vertical axial plane of the gun barrel.

The trough G is held by means of two studs $g^2$, $g^3$ respectively in two slots $N^2—n^2$ at $N^3—n^3$ formed in the frame N.

The portions $N^2$, $N^3$ of the said slots have their axes in line with each other, and this common axis is parallel to the longitudinal axis of the fuse-setting device, the arrangement being such that the movement of one of the studs $g^2$ in the slot $N^2$ by means of an actuating member, is sufficient to cause a to-and-fro movement of the trough toward or away from the fuse-setting device. In the example shown, this actuation is effected as follows:

On an axle-pin $n^1$ which may be the same as that of the handle $n^{17}$, there are fixed an operating lever U and a pinion $n$. The latter gears with a pinion $n^4$ fixed on an axle-pin $n^5$ carried by the frame N. The same axle-pin $n^5$ carries connecting rods $n^6$ jointed to the middle of a link or rocking beam $n^7—n^8$. To the end $n^7$ of the arm of the rocking beam there is pivoted a lever $n^9$ fixed on an axle-pin $n^{10}$. On the same axle-pin $n^{10}$ there is fixed a lever $n^{11}$ formed with a slot $n^{12}$ in which is engaged the stud $g^2$. The arm $n^8$ of the rocking beam is pivoted at its free end to a lever $n^{13}$ fixed on an axle-pin $n^{14}$ which carries a finger $n^{15}$ having a function hereinafter described. It will be readily understood that on the lever U being operated from the position shown in full lines in Figs. 12 and 13, and being turned in a clockwise direction, there will be produced a reverse rotation of the levers $n^6$, $n^9$, $n^{13}$, and at the same time a rotation of the lever $n^{11}$, and the stud $g^2$ will be moved down in the slot $N^2$. The depression of the trough G in the frame N is produced as will be seen, by the operation of the same actuating movement which causes the studs $g^2$ and $g^3$ to engage in the portions $n^2$ and $n^3$ of the slots.

The breech block carriage L is engaged in its position of extreme recoil, behind a spring catch O (Fig. 21), movable vertically in the gun cradle. For this purpose the said carriage is formed on its rear edge and at its base with a chamfer $L^1$ (Fig. 15) which is adapted to move the catch to one side. On its front edge the carriage is formed with a notch $L^2$ in which the catch engages as soon as the recoil has ended. This known catch device is rendered inoperative at the requisite moment by a member carried by one of the connecting rods $N^1$.

The improved apparatus operates as follows:

The parts being in the positions indicated in diagram in Fig. 22, the gun barrel in recoiling, moves the breech block K with its supporting carriage L into the recoil position shown in Fig. 23. The carriage L is caught as above stated behind the catch O. The gun barrel in running out again, first moves the breech-block and forces the extension M of the latter to rotate in the nut formed by the carriage L. When this rotary motion has caused the full sectors of the breech block K to come opposite the plain sectors of the breech of the barrel, the gun barrel will continue to run out, leaving the breech-block K behind. The parts will then occupy the positions they have in Figs. 12 and 13.

From that instant the fuse $h$ of a shell H placed in the trough can be set. For this purpose the handle $E^2$ is operated to bring the fuse-setting device into the position it occupies in Fig. 14$^a$. At the same time the lever U is operated as above described, and it is moved into the position indicated in dot and dash lines in the same Fig. 14. The lever can then be cocked in this position by engaging a spring stud mounted in the handle of the said lever in a notch $n^{16}$ formed in the cover of the frame N. By operating the levers $E^2$ and U, the fuse of the shell has been brought into the fuse-setting device E as shown in Fig. 14$^a$.

When the fuse has been set, the levers $E^2$ and U are moved in the reverse direction, thereby returning the parts into the position shown in full lines in complementary Figs. 12—12$^a$ and 13—13$^a$. Each of the connecting rods $N^1$ carries a stop P which by bearing against the wall of the gun cradle, limits the outward movement of the frame N; they carry a second stop $P^1$ which on abutting against the wall of the cradle, limits likewise the inward movement of the frame.

The shell is then rammed home.

For this purpose the frame N is pushed by means of the handle $n^{17}$ in such a manner as to cause the connecting rods $N^1$ to pivot and move into the position indicated in dot and dash lines in Fig. 13. The axis of the shell is then in the vertical axial plane of the gun barrel in the position indicated in dot and dash lines in complementary Figs. 12—12$^a$ and 13—13$^a$. The lever U is then moved from left to right. By this movement the studs $g^2$ and $g^3$ are first caused to move down in the slot portions $N^2$ and $N^3$ as before, causing the trough G and the shell H to move toward the gun breech. As soon as the studs $g^2$, $g^3$ have come opposite the slots portions $n^2$, $n^3$, the trough is able to move down together with the shell. In this downward movement the rim $H^1$ of the shell case engages in a groove $k^1$ formed in a nose $k$ projecting from the lower part of the breech block K (Figs. 15 and 16). As shown in Fig. 16, the trough G is recessed at its rear end in such a manner as to prevent it in its downward movement from striking the nose $k$; it is therefore able to continue its movement, leaving the shell behind. The front part of the shell rests in the breech opening of the gun as shown in Fig. 15.

In order that the shell may be rammed, it is now necessary to move away the frame N and the trough carried by the latter; this is done by operating the handle $n^{17}$. This moving of the frame out of the way causes automatically the trough G to return into the initial position shown in full lines in Figs. 12 and 13. Also, the carriage L is released at the end of the stroke.

The return of the trough into its initial position is assured by the following mechanism:

A rack Q gearing with the pinion $n$, is guided in the frame N. A stud carrying a roller $q$, projecting from the underside of said rack, meets in the moving of the frame N out of the way, a ramp R carried by the front connecting rod $N^1$. In moving along this ramp, the roller $q$ carries with it the rack Q and actuates through the latter the pinion $n$ which transmits through the pinion $n^4$, rocking beam $n^8$ and levers $n^6$, $n^9$ and $n^{13}$, a rotary movement to the axle-pins $n^{10}$ and $n^{14}$. The finger $n^{15}$ is turned by the axle-pin $n^{14}$ and raises the stud $g^3$, while the rising of the connecting rod $n^{11}$ assures the raising of the stud $g^2$. When the stud $g^3$ has reached the top of the slot $n^3$, the stud $g^2$ has arrived on the other hand at the top of the slot $n^2$. From this instant the stud $g^3$ is released from the finger $n^{15}$, and continues its rising movement in the slot $N^3$ caused by the displacement of the lever $n^{11}$ which returns the stud $g^2$ into the position shown in Figs. 12 and 13.

On the rear connecting rod $N^1$ there is pivoted a device for releasing the carriage L. A small rocking beam S—$S^1$ is pivoted to the connecting rod $N^1$ by means of a pin $s$. A spring stud T has a constant tendency to push the arm $S^1$ of the rocking beam toward the connecting rod $N^1$. The end of the rocking beam S is caught behind the catch O (Fig. 13) when the parts are in the positions shown in full lines in Figs. 12 and 13. In the movement of the frame N and the gun cradle toward each other, the arm S slides along the nose of the catch O and thus moves first from the position shown in Fig. 19 into the position shown in Fig. 20. As this mutual approaching movement continues, the arm S finally assumes the position shown in Fig. 16. When, starting from this position, the frame N is again moved out of the way at the side of the cradle, the arm S of the rocking beam will first be brought into contact with the chamfer $o$ of the catch O (Fig. 20). As the movement out of the way continues, the arm S will slide over the head of the catch O and thus move the latter downward out of the way; this will have the result of releasing the carriage L. Finally, the rocking beam will assume the position shown in Fig. 13.

As soon as the carriage L has been released, the breech block is returned by the recuperator and in its return movement it rams the shell H into the gun breech.

What I claim is:

1. In an apparatus for loading guns, the combination of a recoiling barrel, a recuperator rammer adapted to recoil with the barrel, a cradle to receive the barrel and rammer in their recoil, a catch on the cradle to engage the rammer to hold the latter in its position of recoil when the barrel returns to its firing position, a movable fuse-setting device supported at the side of the breech of the barrel when the latter is in its firing position, a positioning mechanism to receive the cartridge preliminary to loading and operative to present the cartridge successively to the fuse-setting device and to the breech of the barrel, means for moving the fuse-setting device onto and off the nose of the projectile when the cartridge is presented to said device, and a trip actuated by said positioning mechanism when the latter presents the cartridge to the breech of the barrel to trip the catch to release the rammer to ram the cartridge into the breech of the barrel.

2. In an apparatus for loading guns, the combination of a recoiling barrel, a recuperator rammer adapted to recoil with the barrel, a cradle on which the barrel and rammer move during recoil, a catch on the cradle to hold the rammer in its position of recoil after the barrel returns to its firing position, a movable fuse-setting device supported adjacent to the breech of the barrel when the latter is in its firing position, a trough movably mounted on the cradle to support the cartridge and operative to present the cartridge successively to the fuse-setting device and to the breech of the barrel preliminary to loading, means for moving the fuse-setting device onto and off the nose of the projectile when the cartridge is presented to said device, and means actuated by the movement of the trough when the latter presents the cartridge to the breech of the barrel for operating the catch to release the rammer to ram the cartridge into said breech.

3. In an apparatus for loading guns, the combination of a recoiling barrel, a recuperator rammer adapted to recoil with the barrel, a cradle to receive the barrel and rammer in their recoil, a catch on the cradle to engage the rammer to hold the latter in its position of recoil when the barrel returns to its firing position, a movable fuse-setting device supported at the side of the breech of the barrel when the latter is in its firing position, a trough to carry the cartridge preliminary to loading, supporting mechanism movably mounted on the cradle and carrying the trough to permit the moving of said trough to present the cartridge successively to the fuse-setting device and to the breech of the barrel, means for moving the fuse-setting device onto and off the nose of the projectile when the cartridge is presented to said device, and a trip actuated by said supporting mechanism when the cartridge is presented to the breech of the barrel to trip the catch to release the rammer to ram the cartridge into the breech of the barrel.

4. In an apparatus for loading guns, the combination of a recoiling barrel, a cradle to receive the barrel in its recoil, a movable fuse-setting device supported at the side of the breech of the barrel when the latter is in its firing position, a trough to support the cartridge preliminary to loading, arms carrying the trough at their outer ends and pivoted at their inner ends to the cradle to permit the moving of the trough to present the cartridge successively to the fuse-setting device and to the breech of the barrel, means for moving the fuse-setting device onto and off the nose of the projectile when the cartridge is presented to said device, and a recuperator rammer actuated to ram the cartridge into the breech of the barrel when the cartridge is presented to said breech by the trough.

5. In an apparatus for loading guns, the combination of a recoiling barrel, a recuperator rammer adapted to recoil with the barrel, a cradle on which the barrel and rammer move during recoil, a catch on the cradle to hold the rammer in its position of recoil after the barrel returns to its firing position, a movable fuse-setting device supported adjacent to the breech of the barrel when the latter is in its firing position, arms pivoted to the cradle at their inner ends, a trough carried by the outer ends of the arms and movable by the turning of said arms on their pivots, said trough operating to carry the cartridge and to present the same successively to the fuse-setting device and to the breech of the barrel preliminary to loading, means for moving the fuse-setting device onto and off the nose of the projectile when the cartridge is presented to said device, and a trip on one of the pivoted arms for releasing the catch from the recuperator rammer when the trough is positioned to present the cartridge to the breech of the barrel, the released rammer operating to ram the cartridge into said breech.

6. In an apparatus for loading guns, the combination of a barrel, a fuse-setting device supported adjacent to the breech of the barrel with the latter in its firing position, and a positioning mechanism to receive the cartridge preliminary to loading and operative to present the cartridge successively to the fuse-setting device and to the breech of the barrel, said positioning device having to-and-fro movement relative to the fuse-setting device and to the breech of the barrel.

7. In an apparatus for loading guns, the combination of a barrel, a fuse-setting device supported adjacent to the breech of the barrel with the latter in its firing position, a horizontally movable frame, and a trough to receive the cartridge preliminary to loading having a reciprocative movement on the frame, the movements of the frame and trough operating to present the cartridge successively to the fuse-setting device and to the breech of the barrel.

8. In an apparatus for loading guns, the combination of a barrel, a fuse-setting device supported adjacent to the breech of the barrel with the latter in its firing position, a horizontally movable frame, and a trough to receive the cartridge preliminary to loading having a reciprocative movement and also a vertical movement on the frame, the movements of the frame and trough operating to present the cartridge successively to the fuse-setting device and to the breech of the barrel.

9. In an apparatus for loading guns, the combination of a recoiling barrel, a recuperator rammer adapted to recoil with the barrel, a cradle on which the barrel and rammer move during recoil, a catch on the cradle to hold the rammer in its position of recoil after the barrel returns to its firing position, a fuse-setting device supported adjacent to the breech of the barrel when the latter is in its firing position, a frame horizontally movable on the cradle, a trough longitudinally movable on the frame for carrying the cartridge preliminary to loading, said trough through the horizontal movement of the frame operating to present the cartridge successively to the fuse-setting device and to the breech of the barrel, mechanism for moving the trough longitudinally on the frame to move the cartridge relatively to the fuse-setting device and to the breech of the barrel, and means for tripping the catch to release the rammer after the cartridge has been presented to the breech of the barrel.

10. In an apparatus for loading guns, the combination of a recoiling barrel, a recuperator rammer adapted to recoil with the barrel, a cradle on which the barrel and rammer move during recoil, a catch on the cradle to hold the rammer in its position of recoil after the barrel returns to its firing position, a fuse-setting device supported adjacent to the breech of the barrel when the latter is in its firing position, a trough to carry the cartridge preliminary to loading, a frame carrying the trough horizontally movable on the cradle, said frame and trough having a sliding connection to permit vertical and longitudinal movements of the trough relative to the frame, the combined movements of the frame and trough operating to present the cartridge successively to the fuse-setting device and to the breech of the barrel and to withdraw the trough from the path of the rammer after the positioning of the cartridge in loading relation to the breech of the barrel, and a trip operative to trip the catch to release the rammer after the positioning of the cartridge to ram the latter into the breech of the barrel.

11. In an apparatus for loading guns, the combination of a recoiling barrel, a recuperator rammer adapted to recoil with the barrel, a cradle on which the barrel and rammer move during recoil, a catch on the cradle to hold the rammer in its position of recoil after the barrel returns to its firing position, a fuse-setting device supported adjacent to the breech of the barrel when the latter is in its firing position, a trough to carry the cartridge preliminary to loading, a frame carrying the trough horizontally movable on the cradle, said frame and trough having a sliding connection to permit vertical and longitudinal movements of the trough relative to the frame, mechanism for reciprocating the trough on the frame to impart to the trough either longitudinal or vertical movements relative to the frame, the combined movements of the frame and trough operating to present the cartridge successively to the fuse-setting device and to the breech of the barrel and to withdraw the trough from the path of the rammer after the positioning of the cartridge in loading relation to the breech of the barrel, and a trip operative to trip the catch to release the rammer after the positioning of the cartridge to ram the latter into the breech of the barrel.

12. In an apparatus for loading guns, the combination of a recoiling barrel, a recuperator rammer adapted to recoil with the barrel, a cradle on which the barrel and rammer move during recoil, a catch on the cradle to hold the rammer in its position of recoil after the barrel returns to its firing position, a fuse-setting device supported adjacent to the breech of the barrel when the latter is in its firing position, a reciprocative trough to carry the cartridge preliminary to loading, a frame carrying the trough horizontally movable on the cradle, studs on the trough engaging angular slots in the frame, each of said slots having a vertical extension and a rearward extension, said angular slots and engaging studs operating to guide the trough in its reciprocation to move either vertically or longitudinally on the frame, the combined movements of the frame and trough operating to present the cartridge successively to the fuse-setting device and to the breech of the barrel and to withdraw the trough from the path of the rammer after the positioning of the cartridge in loading relation to the breech of the barrel, and a trip operative to trip the catch to release the rammer after the positioning of the cartridge to ram the latter into the breech of the barrel.

13. In an apparatus for loading guns, the combination of a recoiling barrel, a recuperator rammer including the breech-block as a part thereof adapted to recoil with the barrel, a cradle on which the barrel and rammer move during recoil, a catch on the cradle to hold the rammer in position of recoil after the barrel returns to its firing position, a fuse-setting device supported adjacent to the breech of the barrel when the latter is in firing position, a trough to carry the cartridge preliminary to loading, a frame carrying the trough horizontally movable on the cradle to present the cartridge successively to the fuse-setting device and to the breech of the barrel, studs on the trough engaging angular slots in the frame, said slots having vertical extensions with their ends at the same level and also having rearward extensions in a line inclined upwardly from the horizontal, said studs moving in the angular slots serving to guide the trough and cartridge carried thereby above the breech-block of the rammer during the rearward movement of the trough and the vertical extensions of the angular slots permitting the trough and cartridge to drop to a horizontal position between the breech of the barrel when the trough is moved forward to position the cartridge in axial alinement with the breech of the barrel, and a trip operative to trip the catch to release the rammer after the positioning of the cartridge in alinement with the breech of the barrel to ram the cartridge into said breech.

14. In an apparatus for loading guns, the combination of a recoiling barrel, a recuperator rammer including the breech-block as a part thereof adapted to recoil with the barrel, a nose on the breech-block to engage the butt end of a cartridge, a cradle on which the barrel and rammer move during recoil, a catch on the cradle to hold the rammer in position of recoil after the barrel returns to its firing position, a fuse-setting device supported adjacent to the breech of the barrel when the latter is in firing position, a trough to carry the cartridge preliminary to loading, a horizontally movable frame to carry the trough and operative to present the trough and cartridge successively to the fuse-setting device and to the breech of the barrel and also operative to move the trough clear of the travel of the rammer after it has been relieved of the cartridge, said trough having on the frame a longitudinal movement to permit the movement of the cartridge to and from the fuse-setting device and the breech of the barrel, and said trough also having a vertical movement on the frame to permit the butt end of the cartridge to clear the breech-block during the movement of the frame toward the cradle, and the combined vertical and longitudinal movements of the trough permitting the cartridge to be moved downward and forward into the breech of the barrel and the butt end of the cartridge into engagement with the nose on the breech-block as the trough moves clear of the cartridge, and a trip actuated by the outward movement of the frame to release the catch from the rammer so that the latter can ram the cartridge into the breech of the barrel.

15. In an apparatus for loading guns, the combination of a recoiling barrel, a recuperator rammer including the breech-block as a part thereof adapted to recoil with the barrel, a nose on the breech-block to engage the butt end of the cartridge, a cradle on which the barrel and rammer move during recoil, a catch on the cradle to hold the rammer in position of recoil after the return of the barrel to its firing position, a fuse-setting device supported adjacent to the breech of the barrel when the latter is in firing position, a trough to carry the cartridge preliminary to loading, a frame carrying the trough, parallel connecting rods pivoted at their ends to the cradle and to the frame to support the latter in a horizontal movement to and from the cradle, said frame in its movement toward the cradle operating to present the trough and cartridge carried thereby successively to the fuse-setting device and to the breech of the barrel, studs on the trough engaging angular slots in the frame, said slots having vertical extensions and rearward extensions in a line inclined upwardly from the horizontal, said studs moving in the angular slots serving to guide the trough and cartridge carried thereby above the breech-block of the rammer during the rearward movement of the trough and the vertical extensions of the angular slots permitting the trough to drop when moved forward to register the cartridge with the breech of the barrel and to engage the butt of the cartridge with the nose on the breech-block and to drop clear of the cartridge, rock-shafts journaled in the opposite ends of the frame, arms fixed on the rock-shafts connected at their outer ends by a link, a lever fixed on the rear rock-shaft and having a sliding engagement with the rear stud and operating when oscillated to reciprocate the trough, a lifting arm fixed on the forward rock-shaft and extending beneath the forward stud when the latter is in the vertical extension of its angular slot, said lifting arm and said lever through their engagement with the studs operating to lift the trough preliminary to a backward movement of the same, a crank-shaft journaled in the frame, a counter-shaft journaled in the frame having an arm fixed thereon pivoted at its outer end to said connecting link, meshing gears on the counter and crank shafts, the turning of the said crank-shaft operating through the intervening mechanism to move the trough on the frame, and a trip on one of the connecting rods operating to release the catch to free the rammer when the frame is turned outwardly from the cradle.

16. In an apparatus for loading guns, the combination of a recoiling barrel, a recuperator rammer including the breech-block as a part thereof adapted to recoil with the barrel, a cradle on which the barrel and rammer move during recoil, a catch on the cradle to hold the rammer in position of recoil after the barrel returns to its firing position, a fuse-setting device supported adjacent to the breech of the barrel when the latter is in firing position, a trough to carry the cartridge preliminary to loading, a frame carrying the trough, parallel connecting rods pivoted at their ends to the cradle and to the frame to support the latter in a horizontal movement to and from the cradle, said frame in its movement toward the cradle operating to present the trough and cartridge carried thereby successively to the fuse-setting device and to the breech of the barrel, and a trip carried by one of said connecting rods and actuated by the outward movement thereof to trip the catch to release the rammer to ram the cartridge into the breech of the barrel.

17. In an apparatus for loading guns, the combination of a trough to carry the cartridge preliminary to loading and to position the same, a frame having angular slots with each slot having a vertical extension and a rearward extension, studs on the trough engaging the angular slots to guide the trough in its travel, rock-shafts journaled in opposite ends of the frame, arms fixed on the rock-shafts connected at their outer ends by a link, a lever fixed on one of the rock-shafts having a sliding engagement with one of the studs and operating when oscillated to reciprocate the trough, a lifting arm fixed on the other rock-shaft and extending beneath the other stud when the latter is in the vertical extension of its angular slot, said lever and said lifting arm through their engagement with the studs operating to lift the trough preliminary to a backward movement of the latter, a crank-shaft journaled in the frame, a counter-shaft journaled in the frame having an arm pivoted at its outer end to said link and meshing gears on the crank and counter shafts so that the turning of the crank-shaft will impart through the intervening mechanism movement to the trough.

18. In apparatus for loading guns, the combination of a cradle, a trough to carry the cartridge preliminary to loading and to position the same, a frame carrying the trough, parallel connecting rods pivoted at their ends to the cradle and to the frame to support the latter in its horizontal movement to and from the cradle, studs on the trough engaging angular slots in the frame to guide the trough in its travel relative to the frame, rock-shafts journaled in opposite ends of the frame, arms fixed on the rock-shafts connected at their outer ends by a link, a lever fixed on one of the rock-shafts having a sliding engagement with one of the studs and operating when oscillated to reciprocate the trough, a lifting arm fixed on the other rock-shaft and extending beneath the other stud when the latter is in the vertical extension of its angular slot, said lever and said lifting arm through their engagement with the studs operating to lift the trough preliminary to a backward movement of the latter, a crank-shaft journaled in the frame, a counter-shaft journaled in the frame having an arm pivoted at its outer end to said link, and meshing gears on the crank and counter shafts so that the turning of the crank-shaft will impart through the intervening mechanism movement to the trough.

19. In apparatus for loading guns, the combination of a cradle, a trough to carry the cartridge preliminary to loading and to position the same, a frame carrying the trough, parallel connecting rods pivoted at their ends to the cradle and to the frame to support the latter in its horizontal movement to and from the cradle, studs on the trough engaging angular slots in the frame to guide the trough in its travel relative to the frame, rock-shafts journaled in opposite ends of the frame, arms fixed on the rock-shafts connected at their outer ends by a link, a lever fixed on one of the rock-shafts having a sliding engagement with one of the studs and operating when oscillated to reciprocate the trough, a lifting arm fixed on the other rock-shaft and extending beneath the other stud when the latter is in the vertical extension of its angular slot, said lever and said lifting arm through their engagement with the studs operating to lift the trough preliminary to a backward movement of the latter, a crank-shaft journaled in the frame, a counter-shaft journaled in the frame having an arm pivoted at its outer end to said link, meshing gears on the crank and counter shafts so that the turning of the crank-shaft will impart through the intervening mechanism movement to the trough, a rack slidable on the frame and meshing with the gear on the crank-shaft, a roller journaled on the rack, and a ramp on one of the connecting rods operating when the frame is moved outwardly from the cradle to bear on said roller to move the rack to reverse the action of the intervening mechanism to return the trough to its forward lowered position on the frame.

In testimony whereof I have signed this specification.

EUGÈNE SCHNEIDER.